(12) United States Patent
Wood et al.

(10) Patent No.: US 12,265,627 B1
(45) Date of Patent: Apr. 1, 2025

(54) BEHAVIORAL ANALYSIS FOR IDENTIFICATION OF MALICIOUS CODE

(71) Applicant: Wells Fargo Bank, N.A., San Francisco, CA (US)

(72) Inventors: Adrian Wood, Clemmons, NC (US); Douglas Brookes Tucker, Westbrook, CT (US); Michael Barone, Wallingford, CT (US)

(73) Assignee: Wells Fargo Bank, N.A., San Francisco, CA (US)

( * ) Notice: Subject to any disclaimer, the term of this patent is extended or adjusted under 35 U.S.C. 154(b) by 264 days.

(21) Appl. No.: 17/895,879

(22) Filed: Aug. 25, 2022

(51) Int. Cl.
*G06F 21/57* (2013.01)
*G06F 21/56* (2013.01)

(52) U.S. Cl.
CPC .......... *G06F 21/577* (2013.01); *G06F 21/565* (2013.01)

(58) Field of Classification Search
None
See application file for complete search history.

(56) References Cited

U.S. PATENT DOCUMENTS

| | | | | |
|---|---|---|---|---|
| 8,499,063 | B1* | 7/2013 | Satish | G06F 8/62 709/224 |
| 10,817,604 | B1* | 10/2020 | Kimball | G06F 21/563 |
| 11,263,317 | B2 | 3/2022 | Kandel et al. | |
| 11,487,538 | B1* | 11/2022 | Gove, Jr. | G06F 8/77 |
| 2012/0137138 | A1* | 5/2012 | Gregorovic | G06F 8/61 707/694 |
| 2015/0026810 | A1* | 1/2015 | Friedrichs | G06F 21/564 726/23 |
| 2015/0302198 | A1* | 10/2015 | Payne | G06F 21/562 726/23 |
| 2016/0292066 | A1* | 10/2016 | Stevens | G06F 11/3624 |
| 2018/0239898 | A1* | 8/2018 | Haerterich | G06F 21/577 |
| 2020/0218806 | A1 | 7/2020 | Cho | |
| 2021/0200840 | A1* | 7/2021 | Kannan | G06F 8/73 |

(Continued)

FOREIGN PATENT DOCUMENTS

| | | |
|---|---|---|
| CN | 113656800 A | 11/2021 |
| WO | 2019004671 A1 | 1/2019 |
| WO | 2021190138 A1 | 9/2021 |

OTHER PUBLICATIONS

Duan et al., "Towards Measuring Supply Chain Attacks on Package Managers for Interpreted Languages", Network and Distributed Systems Security Symposium, Feb. 4, 2020, 17 pp.

(Continued)

*Primary Examiner* — Jonathan A Bui
(74) *Attorney, Agent, or Firm* — Shumaker & Sieffert, P.A.

(57) ABSTRACT

Techniques are described for a behavioral analysis of metadata associated with source code to identify malicious source code. For example, this disclosure describes a computing system configured to obtain metadata associated with source code of a software package. The computing system is also configured to determine, based on the metadata associated with source code, whether there are any anomalies associated with the source code. The computing system is further configured to, in response to determining that there is at least one anomaly associated with the source code, compute a score for the software package. The computing system is also configured to perform an action based on the score for the software package.

16 Claims, 3 Drawing Sheets

(56) References Cited

U.S. PATENT DOCUMENTS

| | | | |
|---|---|---|---|
| 2021/0263728 A1* | 8/2021 | Farrier | G06F 17/18 |
| 2021/0287231 A1 | 9/2021 | Miltonberger | |
| 2021/0385245 A1 | 12/2021 | Melson et al. | |
| 2022/0004624 A1 | 1/2022 | Revivo et al. | |
| 2022/0083450 A1 | 3/2022 | Geddes et al. | |
| 2022/0308862 A1* | 9/2022 | Espinha | G06N 20/00 |
| 2023/0019837 A1* | 1/2023 | Jennings | G06F 40/20 |

OTHER PUBLICATIONS

Ohm et al., "Backstabber's Knife Collection: A Review of Open Source Software Supply Chain Attacks", International Conference on Detection of Intrusions and Malware, and Vulnerability Assessment, Springer, Jun. 24, 2020, pp. 23-43.

Vu et al., "Poster: Towards Using Source Code Repositories to Identify Software Supply Chain Attacks", Proceedings of the 2020 ACM SIGSAC Conference on Computer and Communications Security, Nov. 9, 2020, pp. 2093-2095.

Xiong et al., "A Method for Assigning Probability Distributions in Attack Simulation Languages", Complex Systems Informatics and Modeling Quarterly (CSIMQ), vol. 151, No. 26, RTU Press, Apr. 30, 2021, pp. 55-77.

* cited by examiner

BEHAVIORAL ANALYSIS FOR IDENTIFICATION OF MALICIOUS CODE

TECHNICAL FIELD

This disclosure relates to computer systems and, in particular, computer systems that perform detection of vulnerabilities in source code from software packages.

BACKGROUND

In software development, computer programmers generate source code to specify the actions to be performed by a computer when executing a software product, e.g., an application or a container, built from the source code. A software product may be built from source code that is proprietary to an organization, publicly accessible via a source code repository (e.g., GitHub), referred to as open source code, or a combination of both.

Many software products may depend on the same software package held in a source code repository. Malicious actors may modify source code of the software package to perform malicious activity when executed, such as by injecting malicious source code into the software product with an otherwise undetectable security bug or "backdoor". The identification of malicious code is critical to the security of an entity or organization and to its customers.

SUMMARY

In general, this disclosure describes a computer system configured to provide a behavioral analysis of metadata associated with source code to identify malicious source code. For example, a build system may obtain source code from software packages, such as from a source code repository, used to build a software product. If source code from a software package is compromised, the build system may build a software product that may be deployed or delivered to a customer or client with an undetectable security bug or "backdoor". This disclosure describes a source code behavioral analysis system that determines whether source code from one or more software packages have any anomalies based on a behavioral analysis of metadata associated with the source code.

In one example, this disclosure is directed to a method including obtaining, by a computing system, metadata associated with source code of a software package. The method also includes determining, by the computing system and based on the metadata associated with source code, whether there are any anomalies associated with the source code. The method further includes computing, in response to determining that there is at least one anomaly associated with the source code, by the computing system, a score for the software package. Additionally, the method includes performing, by the computing system, an action based on the score for the software package.

In another example, this disclosure is directed to a computing system comprising a memory; and one or more processors in communication with the memory. The one or more processors are configured to obtain metadata associated with source code of a software package. The one or more processors are further configured to determine, based on the metadata associated with source code, whether there are any anomalies associated with the source code. The one or more processors are also configured to compute, in response to determining that there is at least one anomaly associated with the source code, a score for the software package. Additionally, the one or more processors are configured to perform an action based on the score for the software package.

In another example, this disclosure is directed to a non-transitory computer-readable storage medium comprising instructions that, when executed, cause one or more processors to obtain metadata associated with source code of a software package. The instructions also cause the one or more processors to determine, based on the metadata associated with source code, whether there are any anomalies associated with the source code. The instructions further cause the one or more processors to compute, in response to determining that there is at least one anomaly associated with the source code, a score for the software package. Additionally, the instructions cause the one or more processors to perform an action based on the score for the software package.

The details of one or more examples are set forth in the accompanying drawings and the description below. Other features, objects, and advantages will be apparent from the description and drawings, and from the claims.

DETAILED DESCRIPTION

Figure 1:
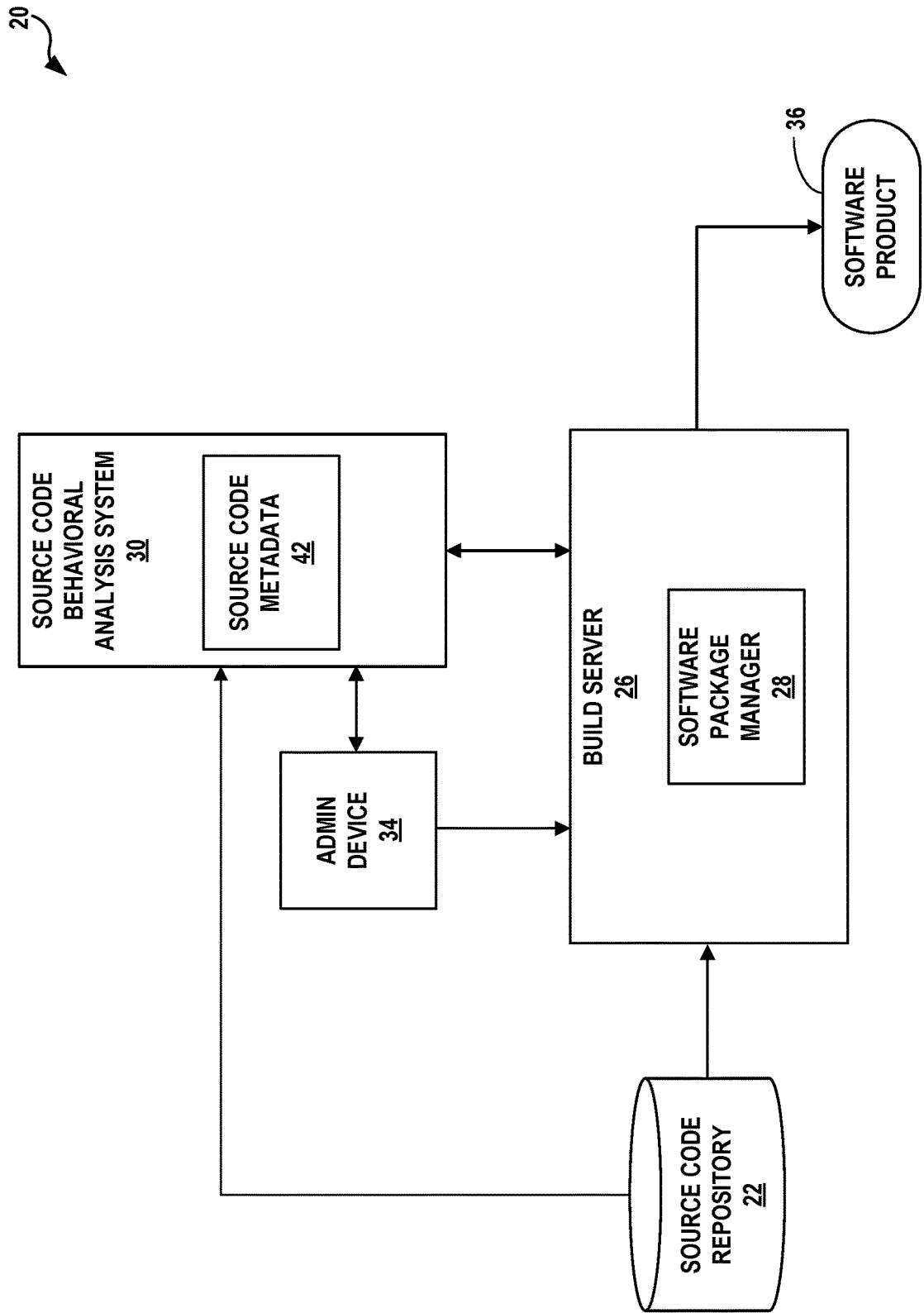
FIG. 1 is a block diagram illustrating an example software product build system including a source code behavioral analysis system configured to identify malicious source code, in accordance with the techniques of this disclosure.

FIG. 1 is a block diagram illustrating an example software product build system 20 including a source code behavioral analysis system 30 configured to identify malicious source code, in accordance with the techniques of this disclosure. In the illustrated example, build system 20 includes a source code repository 22, a build server 26, and source code behavioral analysis system 30. Build system 20 outputs a deliverable software product 36, such as applications or containers, for customers or client systems. According to the disclosed techniques, source code behavioral analysis system 30 determines whether source code from software packages obtained from source code repository 22 have any anomalies based on a behavioral analysis of metadata associated with the source code.

Source code repository 22 may comprise a database, file archive, and/or hosting facility for source code of software packages. The source code held in source code repository 22 may include any type of source code (e.g., C Sharp ("C#"), Java, C Plus Plus ("C++"), etc.) that will be compiled, any type of source code (e.g., JavaScript, Java Server Pages, Python) that will be modified, generated, output as is, or otherwise included as a build artifact, and the like.

Source code repository 22 may be accessible by build server 26 either privately, in the case of proprietary software projects, or publicly in the case of open source or multi-developer software projects. Although illustrated in FIG. 1 as being directly connected to build server 26, in other examples, source code repository 22 may be accessible by build server 26 via one or more private or public networks that may include a wide area network (WAN) (such as the Internet), a local area network (LAN), a virtual private network (VPN)), or another wired or wireless communication network.

Source code of open source software packages within source code repository 22 may be originated and/or maintained by an individual, a plurality of individuals, an organization, and/or a plurality of organizations. The operation which sends the latest changes of the source code to source code repository 22 is referred to as a "commit". In some examples, source code repository 22 may include metadata associated with source code committed to source code repository 22. Metadata associated with the source code may include information about the source code such as the name of the source code, description of its purpose, version number, vendor or author (e.g., originator or maintainer), and/or other information associated with a commit of the source code, such as the time of the commit, a description of the purpose of the commit, the popularity of the source code, the maintenance history of the source code, or the like.

Build server 26 may comprise a centralized, stable, and reliable environment for building software products, e.g., software product 36, for development projects in which source code is obtained from one or more source code repositories, such as source code repository 22. In some examples, build server 26 may represent a server of a continuous integration (CI) or continuous deployment (CD) platform (e.g., GitHub Actions, Jenkins, Travis-CI, etc.). In these examples, build server 26 may include one or more build tools, such as a software package manager 28 (e.g., Gradle, Maven, NPM, RubyGems, pip). Software package manager 28 may obtain, install, and/or otherwise manipulate software packages in source code repository 22. In some examples, software package manager 28 may maintain metadata associated with the source code that software package manager 28 obtains, installs, and/or otherwise manipulates.

Malicious actors may modify source code of a software package in source code repository 22 to perform malicious activity when executed. In some examples, build server 26 may obtain software packages from source code repository 22 that may include malicious source code. Typically, existing testing tools, such as Static Application Security Testing (SAST), Dynamic Application Security Testing (DAST), and/or Interactive Application Security Testing (IAST) tools, are used to detect any vulnerabilities in a software product. For example, DAST tools provide black-box testing of a running application's functionality without examining the source code itself. Unlike DAST, SAST tools provide white-box testing of the source code itself and does not require the execution of the application. IAST tools provide a combination of the DAST and SAST techniques. While SAST tools may provide a more comprehensive detection of malicious source code by examining the source code itself, it is not feasible or realistic for SAST tools to identify malicious source code for all known coding languages due to the fluidity and subjective nature of source code. Moreover, the existing tools require a developer's skill set to identify anomalies in the source code.

In accordance with the techniques described in this disclosure, a source code behavioral analysis system 30 is configured to determine whether source code from software packages have any anomalies based on a behavioral analysis of metadata associated with the source code. In the example of FIG. 1, source code behavioral analysis system 30 may obtain metadata associated with source code of one or more software packages. In some examples, source code behavioral analysis system 30 may obtain metadata associated with source code from source code repository 22. In some examples, source code behavioral analysis system 30 may obtain metadata associated with source code from software package manager 28. In some examples, source code behavioral analysis system 30 may obtain metadata associated with source code that is included in the software package itself.

Based on the metadata, source code behavioral analysis system 30 may determine if there are any anomalies associated with the source code of the software package. As one example, source code behavioral analysis system 30 may obtain metadata associated with a source code as shown below:

"metadata_updated_on": "2021-03-28T03:57:07+00:00"
"metadata_timestamp": "2021-05-06T15:01:44.331695+00:00"
"offset": null,
"origin": "https://github.com/php/php-src.git",
"tag": "https://github.com/php/php-src.git",
"uuid":
    "d43a206fa2540a47886912edee8e3607f80542df"
"git_uuid:
    "d43a206fa2540a47886912edee8e3607f80542df"
"message": "[skip-ci] Fix typo\n\nFixes minor typo.\n\nSigned-off-by: John Doe <John@Doe.com>",
"hash":
    "c730aa26bd52829a49f2ad284b181b7e82a68d7d"

In this example, the metadata associated with the source code of software package, php-src.git, indicates that the author, John Doe, allegedly fixed a typographical error. Based on the metadata associated with the source code, source code behavioral analysis system 30 may determine whether there is an anomaly associated with the source code, such as an anomaly to the behavior of the author who committed the source code. Source code behavior analysis system 30 may also determine the overall health and popularity of the software package, a malicious intent of the author, and/or an overall risk of the source code of the software package. As further described below, source code behavioral analysis system 30 may compute an author risk score (ARS) that specifies a value that indicates a risk level of the behavior of the author, a health score (HS) that specifies a value that indicates the health of the software package, a popularity score (PS) that specifies a value that indicates the popularity of the software package, a probability of malicious intent (MI) that specifies a value that indicates a probability of the author's behavior being malicious, and/or an overall risk level (RL) of the software package (collectively referred to herein as "software package scores").

As one example, source code behavioral analysis system 30 may determine whether there is an anomaly associated with the source code based on the actions performed by the author. For example, source code behavioral analysis system 30 may determine whether one or more actions performed on the source code by the author are appropriate for the purpose of the source code commit. Referring to the example described above, source code behavioral analysis system 30 may determine whether the number of lines of source code that were added by the author are appropriate for the alleged typographical fix. In this example, source code behavioral analysis system 30 may determine, based on historical data of the software package (e.g., from metadata of the software package collected over time), that typographical fixes typically added minimal lines of source code (e.g., 1-2 lines of source code), whereas the alleged typographical fix of the latest commit added a larger number of lines of source code (e.g., 11 lines of source code), and thus determine there is an anomaly associated with the source code due to the actions performed by the author.

In some examples, source code behavioral analysis system 30 may determine whether there is an anomaly associated with the source code based on when the source code was committed by the author. In this example, source code behavioral analysis system 30 may determine whether the source code commit occurred at an unusual time. For example, source code behavioral analysis system 30 may determine, based on the geographical location of the author (e.g., Eastern Time Zone), that the commit of the source code occurred at an unusual time (e.g., 03:57:07 AM), and thus determine there is an anomaly associated with the source code due to the behavior of the author. In some examples, source code behavioral analysis system 30 may determine, based on historical data of the software package, that the author typically performs a commit of source code during traditional working hours (e.g., 9:00 AM through 5:00 PM), whereas the alleged typographical fix of the latest commit occurred at an unusual time for this particular author (e.g., 03:57:07 AM), and thus determine there is an anomaly associated with the source code due to the behavior of the author.

In some examples, source code behavioral analysis system 30 may determine whether there is an anomaly associated with the source code based on whether the author committed the same one or more lines of source code for a plurality of software packages. For example, if the author committed the same one or more lines of source code for a plurality of software packages, source code behavioral analysis system 30 may determine there is an anomaly associated with the source code due to the behavior of the author. In some examples, source code behavioral analysis system 30 may determine whether there is an anomaly associated with the source code based on whether the commit was unsigned from an author who typically signs the commit. If the commit of the source code was unsigned from an author that typically signs the commit, source code behavioral analysis system 30 may determine there is an anomaly associated with the source code due to the behavior of the author. In some examples, source code behavioral analysis system 30 may determine whether there is an anomaly associated with the source code based on whether the software package includes an executable (EXE) file that is not used for anything in the software package. The above are merely examples and source code behavioral analysis system 30 may determine whether there is an anomaly associated with the source code based on any information within the metadata associated with the source code.

In response to determining there is an anomaly associated with the source code due to the behavior of the author, source code behavioral analysis system 30 may, in some examples, compute an author risk score (ARS) that specifies a value that indicates a risk level of the behavior of the author. In some examples, the ARS may be represented by a numerical value, a color (e.g., red, yellow, blue), an image, or any other type of indication. In some examples, the ARS is computed based on a computational model and/or machine learning model.

In some examples, source code behavioral analysis system 30 may compute an ARS for each detected anomaly or an ARS for an aggregate of all detected anomalies. As one example, source code behavioral analysis system 30 may compute a first ARS (e.g., yellow color) that indicates a medium risk level for a first detected anomaly (e.g., commit of the source code occurring at an unusual time) and compute a second ARS (e.g., red color) that indicates a high risk level for a second detected anomaly (e.g., addition of an unusual number of lines of source code). As another example, source code behavioral analysis system 30 may compute an ARS (e.g., orange color) that indicates an aggregated risk level for all detected anomalies (e.g., commit of the source code occurring at an unusual time and addition of an unusual number of lines of source code).

In some examples, source code behavioral analysis system 30 may determine the health and/or popularity of the software package. For example, source code behavioral analysis system 30 may determine, based on the metadata associated with the source code, the health of the software package, such as whether the software package is actively being maintained, how long the software package has been available, how many people are maintaining the software package, when the software package was last updated, how long the software package has been in the source code repository, or the like.

In some examples, source code behavioral analysis system 30 may compute a health score (HS) that specifies a value that indicates the health of the software package. In some examples, the HS may be represented by a numerical value, a color (e.g., red, yellow, blue), an image, or any other type of indication. In some examples, the HS is computed based on a computational model and/or machine learning model. As one example, source code behavioral analysis system 30 may compute a low HS (e.g., red) based on the software package not being actively maintained. As another example, source code behavioral analysis system 30 may compute a medium HS (e.g., yellow) based on the software package being moderately maintained.

Additionally, or alternatively, source code behavioral analysis system 30 may, in some examples, determine the popularity of the software package, such as usage of the software package. For example, source code behavioral analysis system 30 may determine, based on the metadata associated with the source code, the number of downloads of the software package by a single entity or organization, the number of downloads of the software package by all entities or organizations, the number of downloads of the software package compared to the number of downloads of other software packages.

Source code behavioral analysis system 30 may compute a popularity score (PS) that specifies a value that indicates the popularity of the software package. In some examples, the PS may be represented by a numerical value, a color (e.g., red, yellow, blue), an image, or any other type of indication of the popularity of the software package. In some examples, the PS is computed based on a computational model and/or machine learning model. As one example, source code behavioral analysis system 30 may compute a low PS (e.g., blue) based on a low number of downloads of the software package and/or the low usage of the software package by an entity or organization. As another example, source code behavioral analysis system 30 may compute a high PS (e.g., red) based on a high number of downloads of the software package and/or the high usage of the software packet by the entity or organization.

In this example, source code behavioral analysis system 30 may use the health and/or popularity of the software package to determine whether an entity or organization should actively take over ownership or maintenance of the software package. As one example, source code behavioral analysis system 30 may determine that a software package is not actively being maintained and that there is a large number of downloads of the software package by an organization, which indicates a high use of the software package. In this example, source code behavioral analysis system 30 may provide an indication for the organization to take over ownership or maintenance of the software package.

In some examples, source code behavioral analysis system 30 may compute a probability of malicious intent (MI) based on one or more of the computed scores (e.g., ARS, HS, PS, etc.). For example, source code behavioral analysis system 30 may compute an ARS that indicates a medium risk level to the commit of the source code that occurred at an unusual time. While certain behavior of the author is determined to be an anomaly (e.g., a commit of source code occurring at an unusual time), the author's behavior may not be malicious. For example, source code behavioral analysis system 30 may also determine that no obfuscated code was detected. In this example, source code behavioral analysis system 30 may compute a low probability of malicious intent of the author's behavior to commit the source code at an unusual time because no obfuscated code was detected. Alternatively, source code behavioral analysis system 30 may determine that obfuscated code was detected. In this example, source code behavioral analysis system 30 may compute a high probability of malicious intent of the author's behavior to commit the source code at an unusual time because obfuscated code was detected. As another example, source code behavioral analysis system 30 may compute a probability of malicious intent based on ARS and PS. For example, source code behavioral analysis system 30 may compute an ARS that indicates a medium risk level to the commit of the source code that occurred at an unusual time, and compute a PS that indicates a large number of downloads of the software package by an organization. In this example, source code behavioral analysis system 30 may compute a higher probability of malicious intent of the author's behavior given the popularity of the software package.

In some examples, source code behavioral analysis system 30 may compute an overall risk level of the software package. For example, source code behavioral analysis system 30 may compute an overall risk level based on the probability of malicious intent of the author's behavior and one or more of the computed scores (e.g., health score). For instance, source code behavioral analysis system 30 may compute a high probability of malicious intent of the author's behavior to commit the source code at an unusual time because obfuscated code was detected and a low health score based on the software package not being actively maintained. In this example, source code behavioral analysis system 30 may compute a high overall risk level of the software package based on the high probability of malicious intent of the author's behavior and the low health score based on maintenance of the software package.

In response to determining an overall risk level of the software package, source code behavioral analysis system 30 may perform an action. In some examples, source code behavioral analysis system 30 may output an indication of the overall risk level to admin device 34 such that an administrator may be notified of the risk of using the software package. In some examples, source code behavioral analysis system 30 may send a report of the software package scores to admin device 34 for further analysis. In some examples, source code behavioral analysis system 30 may automatically generate a ticket to address any issues with the software package. The administrator, such as a computer programmer, may use the indication of the overall risk level to perform further investigation of the software package and/or perform remedial actions, such as fixing software products that may depend on the software package, pulling the software package from the source code repository, taking over ownership and/or maintenance of the software package, or the like.

In some examples, source code behavioral analysis system 30 may selectively gate or block the use of the software package in the software development lifecycle pipeline. For example, source code behavioral analysis system 30 may block a software package determined to have a high overall risk level (e.g., consumer application using source code of software package) from being used in a software product. Additionally, or alternatively, source code behavioral analysis system 30 may stop and/or pause the software development lifecycle for an administrator and/or software developer to review and/or resolve the issues with software package. This is referred to as "gating". For example, source code behavioral analysis system 30 may determine the software package has a medium overall risk level (e.g., internal application using source code of software package) and may gate the use of the software package for an administrator and/or developer to review and/or resolve the issues with the software package. Source code behavioral analysis system 30 may selectively gate or block the use of a software package for any risk level.

Admin device 34 may be associated with one or more human administrators of build system 20 and/or source code behavioral analysis system 30. Admin device 34 may comprise any suitable communication or computing device, such as a laptop or notebook computer, desktop computer, a smart phone or tablet, or any other type of computing device capable of communicating with source code behavioral analysis system 30 and/or build server 26 either directly or over a network.

Admin device 34 may receive reports and/or notifications from source code behavioral analysis system 30 that indicate the computed scores. In some examples, the reports and/or notifications may indicate the overall risk level or indicate the individually computed scores. In some examples, a human administrator using admin device 34 or an automated program or system running on admin device 34 may be able to consume the reports and/or to take action (e.g., take over ownership or maintenance of software package, review and verify the software package, stop use of the software package, etc.).

Source code behavioral analysis system 30 may comprise a computing system including one or more computing devices or may be a software product running on one or more computing device of a computing system (not shown in FIG. 1). In some examples, the computing system executing source code behavioral analysis system 30 may be implemented as any suitable computing system, such as one or more server computers, workstations, mainframes, appliances, cloud computing systems, and/or other computing systems that may be capable of performing operations and/or functions described in accordance with one or more aspects of the present disclosure.

In the illustrated example of FIG. 1, source code behavioral analysis system 30 may not include build server 26 and source code behavioral analysis system 30 is not executed on build server 26. This separation may be beneficial, for example, in the case where a malicious actor has compromised build server 26 such that both the build tools and analysis tools running on build server 26 may be subverted. In this example, source code behavioral analysis system 30 comprises an independent, secure system used for the analysis. In other examples, source code behavioral analysis system 30 may include or be executed on a build server, such as build server 26.

The techniques may provide one or more technical advantages. For example, metadata is not specific to any coding language and provides an unbiased and holistic view of source code. By analyzing metadata associated with the source code, the system may identify any anomalies associated with the source code without requiring knowledge of all coding languages, such as by analyzing the behavior of the author who committed the source code. This may provide additional or alternative data points to detect any anomalies associated with the source code that other tools may not consider or analyze.

Figure 2:
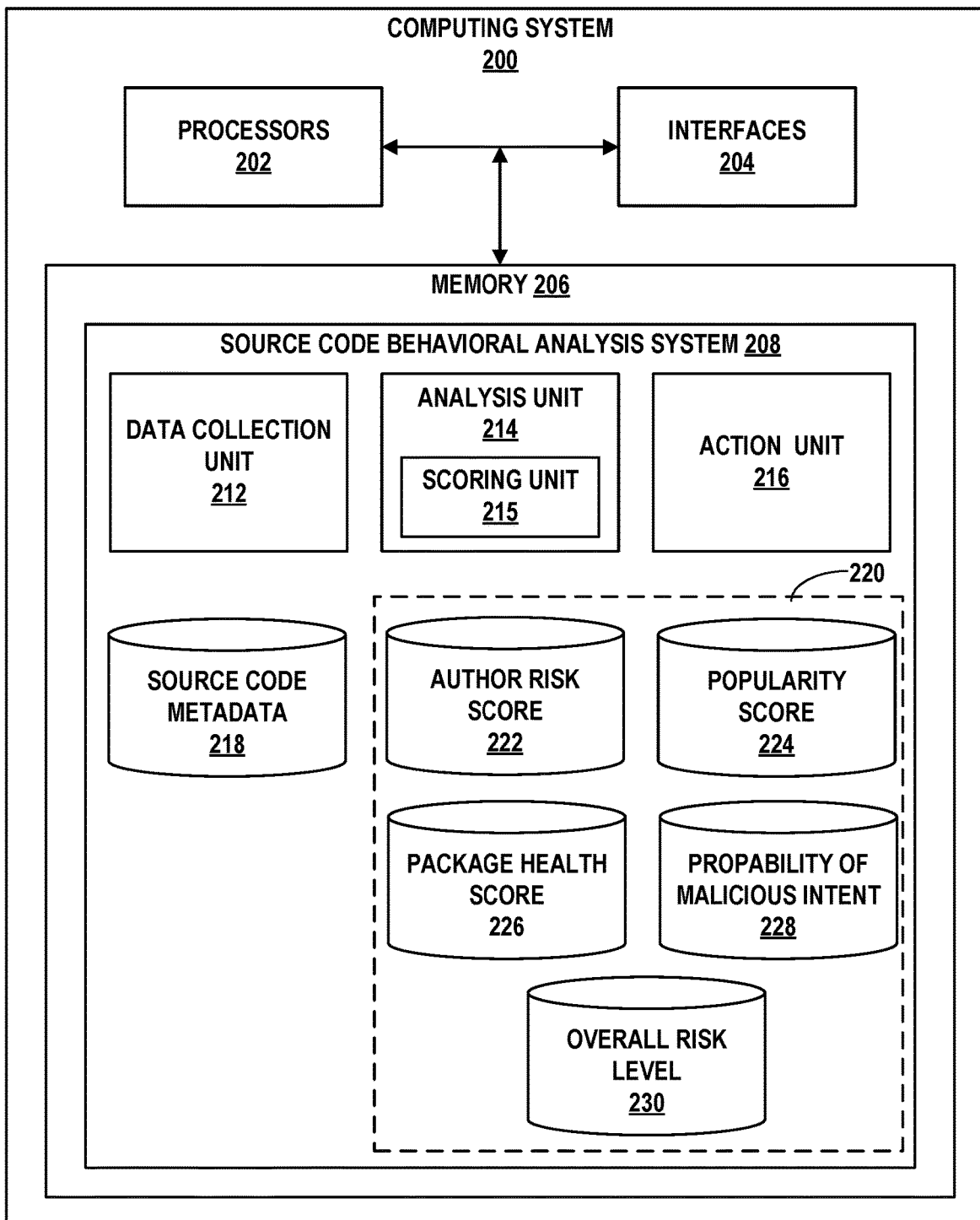
FIG. 2 is a block diagram illustrating an example computing system configured to execute a source code behavioral analysis system, in accordance with the techniques of this disclosure.

FIG. 2 is a block diagram illustrating an example computing system 200 configured to support a source code behavioral analysis system 208, in accordance with the techniques of this disclosure. In some examples, source code behavioral analysis system 208 may operate substantially similar to source code behavioral analysis system 30 of FIG. 1.

In the example of FIG. 2, computing system 200 may include one or more computing devices. Computing system 200 includes processors 202, interfaces 204, and memory 206. Memory 206 stores source code behavioral analysis system 208 that includes a data collection unit 212, an analysis unit 214, an action unit 216, a source code metadata database 218, and a software package scores database 220. As illustrated in FIG. 2, the components, units or modules of computing system 200 are coupled (physically, communicatively, and/or operatively) using communication channels for inter-component communications. In some examples, the communication channels may include a system bus, a network connection, an inter-process communication data structure, or any other method for communicating data.

Processors 202, in one example, may comprise one or more processors that are configured to implement functionality and/or process instructions for execution within computing system 200. For example, processors 202 may be capable of processing instructions stored by memory 206. Processors 202 may include, for example, microprocessors, digital signal processors (DSPs), application specific integrated circuits (ASICs), field-programmable gate array (FPGAs), or equivalent discrete or integrated logic circuitry, or a combination of any of the foregoing devices or circuitry.

Memory 206 of computing system 200 may store an operating system (not shown) executable by processors 202 to control the operation of components of computing system 200. Memory 206 may also be configured to store information within computing system 200 during operation. Memory 206 may include a computer-readable storage medium or computer-readable storage device. In some examples, memory 206 includes one or more of a short-term memory or a long-term memory. Memory 206 may include, for example, random access memories (RAM), dynamic random-access memories (DRAM), static random-access memories (SRAM), magnetic discs, optical discs, flash memories, or forms of electrically programmable memories (EPROM) or electrically erasable and programmable memories (EEPROM). In some examples, memory 206 is used to store program instructions for execution by processors 202. Memory 206 may be used by software or applications running on computing system 200 (e.g., source code behavioral analysis system 208) to temporarily store information during program execution.

Computing system 200 may utilize interfaces 204 to communicate with other systems or devices via one or more connections or networks, e.g., source code repository 22, build server 26, and/or admin device 34 of FIG. 1. Interfaces 204 may be network interfaces (such as Ethernet interfaces, optical transceivers, radio frequency (RF) transceivers, Wi-Fi or Bluetooth radios, or the like), telephony interfaces, application programming interfaces (APIs), or any other type of interface that can send and receive information.

Source code behavioral analysis system 208 may operate substantially similar to source code behavioral analysis system 30 of FIG. 1. Data collection unit 212 may obtain metadata associated with source code of software packages. In some examples, data collection unit 212 may obtain metadata associated with source code from source code repository 22 and/or a software package manager 28 of build server 26 via interfaces 204. For example, data collection unit 212 may implement one or more application programming interfaces (APIs) to obtain metadata associated with source code from source code repository 22. The metadata associated with source code may be stored in source code metadata database 218.

In response to obtaining data from metadata associated with source code, analysis unit 214 may determine whether there is an anomaly to the behavior of the author, determine the overall health and popularity of the software package, a malicious intent of the author, and/or an overall risk of the source code of the software package. In this example, analysis unit 214 may include scoring unit 215 to compute software package scores, such as an author risk score (ARS) of an author of a software package, a health score (HS) of the software package, a popularity score (PS) of the software package, a probability of malicious intent (MI), and/or an overall risk level (RL). Scoring unit 215 may implement a computational model and/or machine learning model to compute the software package scores. In some examples, scoring unit 215 may implement an algorithm to compute each of the software package scores. In some examples, scoring unit 215 may implement an algorithm based on historical data, data points of known actions that resulted in malicious activity, or the like.

Computing system 200 may include one or more databases 220 that store software package scores. For example, computing system 200 may include an author risk score database 222, a popularity database 224, a package health score database 226, a probability of malicious intent database 228, and an overall risk level database 230. Although databases 220 are illustrated as included in memory 206, databases 220 may be located external to computing system 200, such as in a centralized and/or distributed database.

Action unit 216 is configured to perform an action based on the score for the software package. In some examples, action unit 216 may obtain the overall risk level from overall risk level database 230 and output an indication of the overall risk level to an admin device (e.g., admin device 34 of FIG. 1) such that an administrator may be notified of the risk of using the software package. In some examples, action unit 216 may obtain the software package scores from software package scores databases 220, and generate and send a report of the software package scores to the admin device for further analysis. In some examples, action unit 216 may automatically generate a ticket (e.g., service request, event, incident, alert, etc.) to address any issues with the software package. For example, action unit 216 may invoke a ticketing system to generate and send a ticket to the admin device to inform an administrator and/or software developer to review and/or resolve the issues within the software package. In some examples, action unit 216 may selectively gate or block the use of the software package in the software development lifecycle pipeline. In some examples, action unit 216 may, in response to the administrator and/or software developer verifying anomalies and/or correcting the issues within the software package, reanalyze the software package and/or proceed with the software development lifecycle pipeline to generate the software product.

Figure 3:
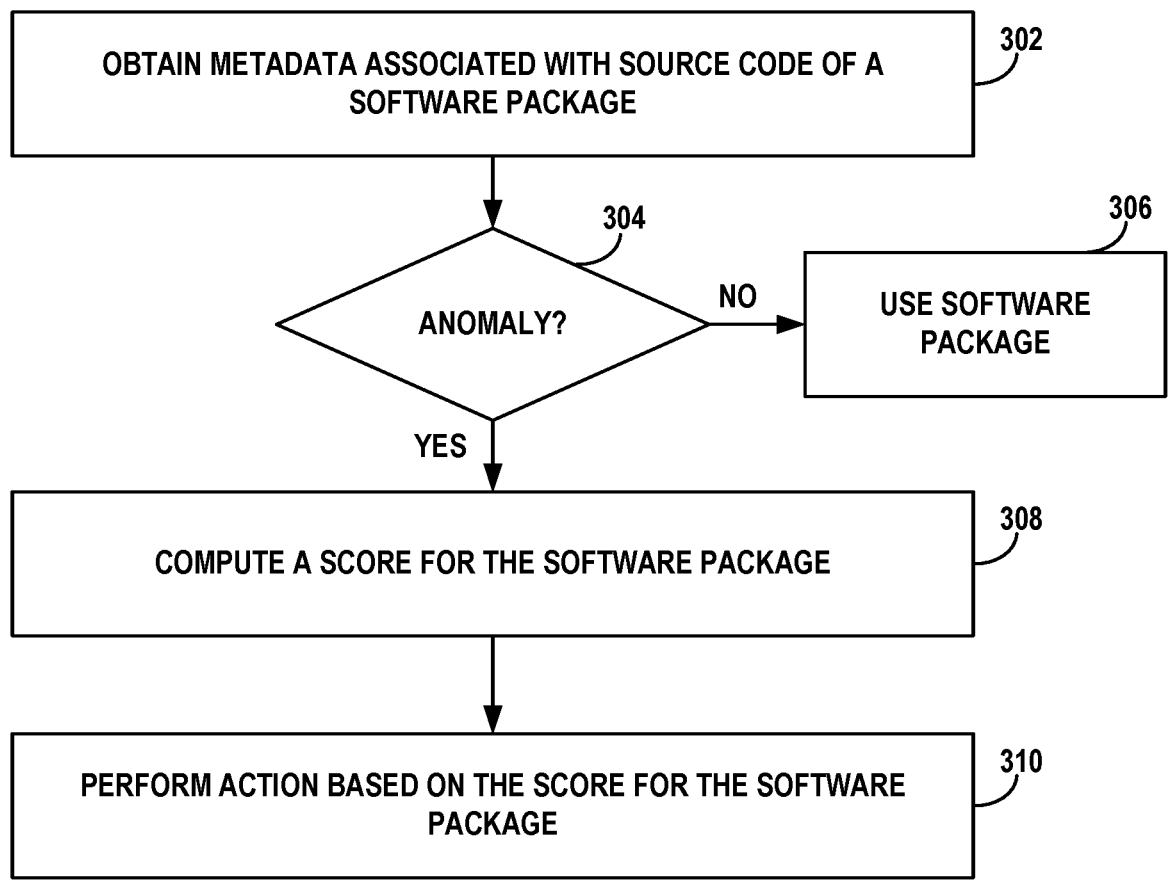
FIG. 3 is a flowchart illustrating an example operation of source code behavioral analysis system, in accordance with the techniques of this disclosure.

FIG. 3 is a flowchart illustrating an example operation of a source code behavioral analysis system, in accordance with the techniques of this disclosure. For purposes of explanation, the example operation of FIG. 3 is described with respect to source code behavioral analysis system 30 of FIG. 1 and source code behavioral analysis system 206 of FIG. 2.

Source code behavioral analysis system 208 obtains metadata associated with source code of one or more software packages (302). In some examples, data collection unit 212 of source code behavioral analysis system 206 obtains, via interfaces 304, metadata associated with source code. In some examples, source code behavioral analysis system 208 may obtain metadata associated with source code from a source code repository (e.g., source code repository 22 of FIG. 1). In some examples, source code behavioral analysis system 208 may obtain metadata associated with source code from a software package manager (e.g., software package manager 28 of FIG. 1). In some examples, source code behavioral analysis system 208 may obtain metadata associated with source code that is included in the software package itself. Data collection unit 212 may store the metadata associated with the source code in source code metadata database 218.

In response to obtaining metadata associated with source code of the software package, source code behavioral analysis system 208 determines whether there are any anomalies associated with the source code (304). For example, analysis unit 214 of source code behavioral analysis system 208 may access source code metadata database 218 to obtain the metadata and determine whether there are any anomalies associated with the source code based on behavior of an author of the source code, such as whether one or more actions performed by the author of the source code is appropriate for a purpose of a commit of the source code, whether a commit of the source code occurred at an unusual time, whether the author of the source code committed one or more lines of source code for a plurality of software packages, whether a commit of the source code was unsigned from the author who typically signs, etc.

In response to determining that there is no anomaly associated with the source code ("NO" of step 304), the build system may proceed to use the software package (306). For example, in response to analysis unit 214 determining there are no anomalies associated with the source code, action unit 216 of source code behavioral analysis system 208 may output, to an administrator computing device (e.g., admin device 34 of FIG. 1), an indication that the software package does not have any anomalies and/or an indication that build system may proceed to use the software package.

In response to determining that there is at least one anomaly associated with the source code ("YES" of step 304), source code behavioral analysis system 208 computes a score for the software package (306). For example, analysis unit 214 may include a scoring unit 215 to compute an author risk score (ARS) that specifies a value that indicates a risk level of the behavior of the author, a health score (HS) that specifies a value that indicates the health of the software package, a popularity score (PS) that specifies a value that indicates the popularity of the software package, a probability of malicious intent (MI) that specifies a value that indicates a probability of the author's behavior being malicious, and/or an overall risk level (RL). As described above, each of the software package scores may be represented by a numerical value, a color (e.g., red, yellow, blue), an image, or any other type of indication. In some examples, each of the software package scores is computed based on a computational model and/or machine learning model. Analysis unit 214 may store the software package scores in one or more of databases 220.

Source code behavioral analysis system 208 then performs an action based on the score for the software package (310). For example, action unit 216 of source code behavioral analysis system 208 may output, to an administrator computing device (e.g., admin device 34 of FIG. 1), an indication that the software package has at least one anomaly associated with the source code. In some examples, action unit 216 of source code behavioral analysis system 208 may send a report of the software package scores to the administrator computing device for further analysis. In some examples, action unit 216 of source code behavioral analysis system 208 may automatically generate a ticket to address any issues with the software package. In some examples, action unit 216 of source code behavioral analysis system 208 may block use of the software package in a software product. In some examples, action unit 216 may, in response to the administrator and/or software developer verifying anomalies and/or correcting the issues within the software package, reanalyze the software package or proceed with the software development lifecycle pipeline to generate the software product.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

What is claimed is:

1. A method comprising:
obtaining, by a computing system, metadata associated with source code of a software package;
determining, by the computing system and based on the metadata associated with source code, whether there are any anomalies associated with the source code;
in response to determining that there is at least one anomaly associated with the source code, computing, by the computing system, an overall risk level for the software package, wherein computing the overall risk level for the software package is based on an author risk score that specifies a value that indicates a risk level of behavior of the author, a popularity score that specifies a value that indicates the popularity of the software package, and a health score that specifies a value that indicates a health of the software package; and
performing, by the computing system, an action based on the overall risk level for the software package, wherein performing the action comprises blocking use of the software package in a software product.

2. The method of claim 1, wherein determining whether there are any anomalies associated with the source code comprises:
determining whether there are any anomalies associated with the source code based on behavior of an author of the source code.

3. The method of claim 2, wherein determining whether there are any anomalies associated with the source code based on behavior of an author of the source code comprises:
determining whether there are any anomalies associated with one or more actions performed by the author of the source code associated with a commit of the source code.

4. The method of claim 2, wherein determining whether there are any anomalies associated with the source code based on behavior of an author of the source code comprises:
determining whether there are any anomalies associated with the source code based on a time a commit of the source code occurred.

5. The method of claim 2, wherein determining whether there are any anomalies associated with the source code based on behavior of an author of the source code comprises:
determining whether the author of the source code committed one or more lines of source code for a plurality of software packages.

6. The method of claim 2, wherein determining whether there are any anomalies associated with the source code based on behavior of an author of the source code comprises:
determining whether a commit of the source code was unsigned from the author who typically signs.

7. The method of claim 1, wherein performing the action comprises outputting, by the computing system and to an administrator computing device, an indication that the software package has at least one anomaly associated with the source code.

8. The method of claim 1, wherein obtaining metadata associated with source code of the software package comprises:
obtaining metadata associated with source code from one or more of a source code repository or software package manager.

9. A computing system comprising:
a memory; and
one or more processors in communication with the memory, the one or more processors configured to:
obtain metadata associated with source code of a software package;
determine, based on the metadata associated with source code, whether there are any anomalies associated with the source code;
in response to determining that there is at least one anomaly associated with the source code, compute an overall risk level for the software package, wherein computing the overall risk level for the software package is based on an author risk score that specifies a value that indicates a risk level of behavior of the author, a popularity score that specifies a value that indicates the popularity of the software package, and a health score that specifies a value that indicates a health of the software package; and
perform an action based on the overall risk level for the software package, wherein performing the action comprises blocking use of the software package in a software product.

10. The computing system of claim 9, wherein to determine whether there are any anomalies associated with the source code, the one or more processors are configured to:
determine whether there are any anomalies associated with the source code based on behavior of an author of the source code.

11. The computing system of claim 10, wherein to determine whether there are any anomalies associated with the source code based on behavior of an author of the source code, the one or more processors are configured to:
determine whether there are any anomalies associated with one or more actions performed by the author of the source code associated with a commit of the source code.

12. The computing system of claim 10, wherein to determine whether there are any anomalies associated with the source code based on behavior of an author of the source code, the one or more processors are configured to:
determine whether there are any anomalies associated with the source code based on a time a commit of the source code occurred.

13. The computing system of claim 10, wherein to determine whether there are any anomalies associated with the source code based on behavior of an author of the source code, the one or more processors are further configured to:
determine whether the author of the source code committed one or more lines of source code for a plurality of software packages.

14. The computing system of claim 10, wherein to determine whether there are any anomalies associated with the source code based on behavior of an author of the source code, the one or more processors are further configured to:
determine whether a commit of the source code was unsigned from the author who typically signs.

15. The computing system of claim 9, wherein to perform the action, the one or more processors are configured to:
    output, to an administrator computing device, an indication that the software package has at least one anomaly associated with the source code.

16. Non-transitory computer-readable storage media comprising instructions that, when executed, cause one or more processors to:
    obtain metadata associated with source code of a software package;
    determine, based on the metadata associated with source code, whether there are any anomalies associated with the source code;
    in response to determining that there is at least one anomaly associated with the source code, compute an overall risk level for the software package, wherein computing the overall risk level for the software package is based on an author risk score that specifies a value that indicates a risk level of behavior of the author, a popularity score that specifies a value that indicates the popularity of the software package, and a health score that specifies a value that indicates a health of the software package; and
    perform an action based on the overall risk level for the software package, wherein performing the action comprises blocking use of the software package in a software product.

* * * * *